(12) United States Patent
Huxham

(10) Patent No.: US 8,909,556 B2
(45) Date of Patent: Dec. 9, 2014

(54) SECURITY GATEWAY COMMUNICATION

(75) Inventor: Horatio Nelson Huxham, Cape Town (ZA)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 14/234,139

(22) PCT Filed: Jul. 20, 2012

(86) PCT No.: PCT/US2012/047687
§ 371 (c)(1),
(2), (4) Date: Mar. 10, 2014

(87) PCT Pub. No.: WO2013/013189
PCT Pub. Date: Jan. 24, 2013

(65) Prior Publication Data
US 2014/0215642 A1    Jul. 31, 2014

Related U.S. Application Data

(60) Provisional application No. 61/510,023, filed on Jul. 20, 2011.

(51) Int. Cl.
*G06Q 20/00* (2012.01)
*H04L 29/06* (2006.01)

(52) U.S. Cl.
CPC ..................................... *H04L 63/10* (2013.01)
USPC ................... 705/64; 705/76; 705/78; 726/12; 713/168

(58) Field of Classification Search
CPC .................................................. G06Q 20/382
USPC ..................... 705/64, 76, 78; 726/12; 713/168
See application file for complete search history.

(56) References Cited

U.S. PATENT DOCUMENTS 6,438,386 B2    8/2002    Joshi et al.
8,683,053 B2 *  3/2014    Asveren et al. ............... 709/228
(Continued)

FOREIGN PATENT DOCUMENTS

WO    2005-006598 A1    1/2005
WO    2009-044371 A1    4/2009
WO    2009-082334 A1    7/2009

OTHER PUBLICATIONS

International Search Report and Written Opinion mailed on Jan. 28, 2013 for International Patent Application No. PCT/US2012/047687.
International Search Report and Written Opinion issued on Mar. 25, 2013 for International Patent Application No. PCT/US2012/047645, 10 pages.

(Continued)

*Primary Examiner* — Christopher Brown
(74) *Attorney, Agent, or Firm* — Kilpatrick Townsend & Stockton LLP

(57) ABSTRACT

A gateway device and methods performed therein to prevent unauthorized client devices from connecting to the host network of the gateway device is described. The gateway device does not respond right away to an individual client message sent to the gateway device. Instead, the gateway device only responds to a predetermined sequence of the client messages, which is only known to the gateway device and authorized client devices. Because the gateway device will not respond to random client messages and the likelihood that an unauthorized client device can correctly guess the predetermined sequence of the client messages is low, the risk of a malicious party being able to hack into the host network, for example, by using port scanning techniques, can be mitigated.

18 Claims, 7 Drawing Sheets

(56) References Cited

U.S. PATENT DOCUMENTS

| | | |
|---|---|---|
| 2009/0227234 A1 | 9/2009 | Bosch et al. |
| 2010/0191602 A1 | 7/2010 | Mikkelsen et al. |
| 2010/0268829 A1* | 10/2010 | Ly et al. .................. 709/227 |
| 2011/0022835 A1 | 1/2011 | Schibuk |
| 2011/0103586 A1 | 5/2011 | Nobre |
| 2011/0122827 A1 | 5/2011 | Bjorsell et al. |

OTHER PUBLICATIONS

International Preliminary Report on Patentability issued on Jan. 30, 2014 for International Patent Application No. PCT/US2012/047645, 7 pages.

International Preliminary Report on Patentability mailed on Jan. 30, 2014 for International Patent Application No. PCT/US2012/047687, 5 pages.

* cited by examiner

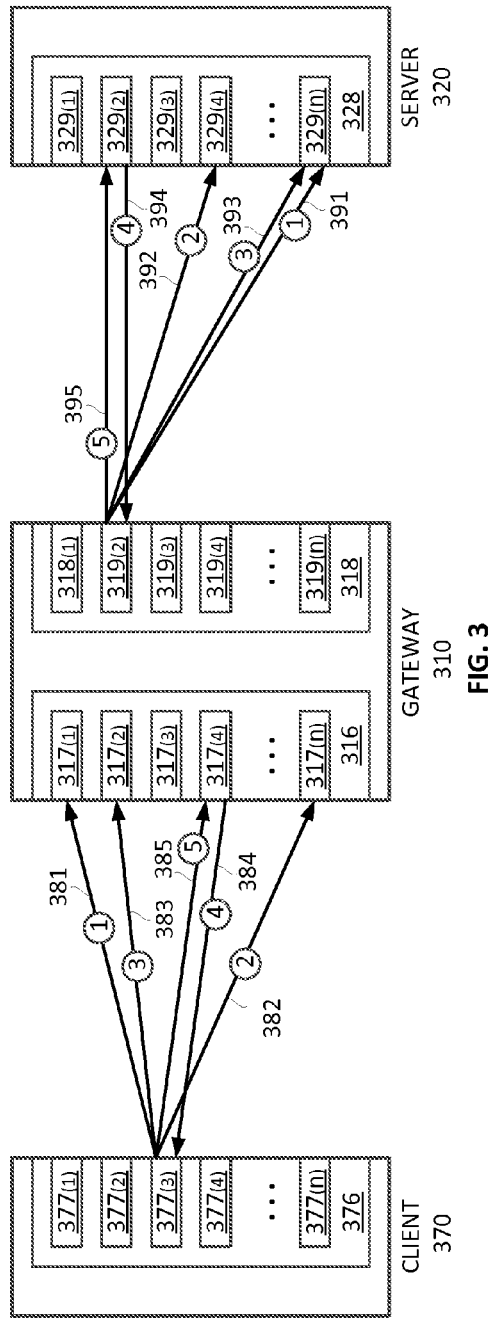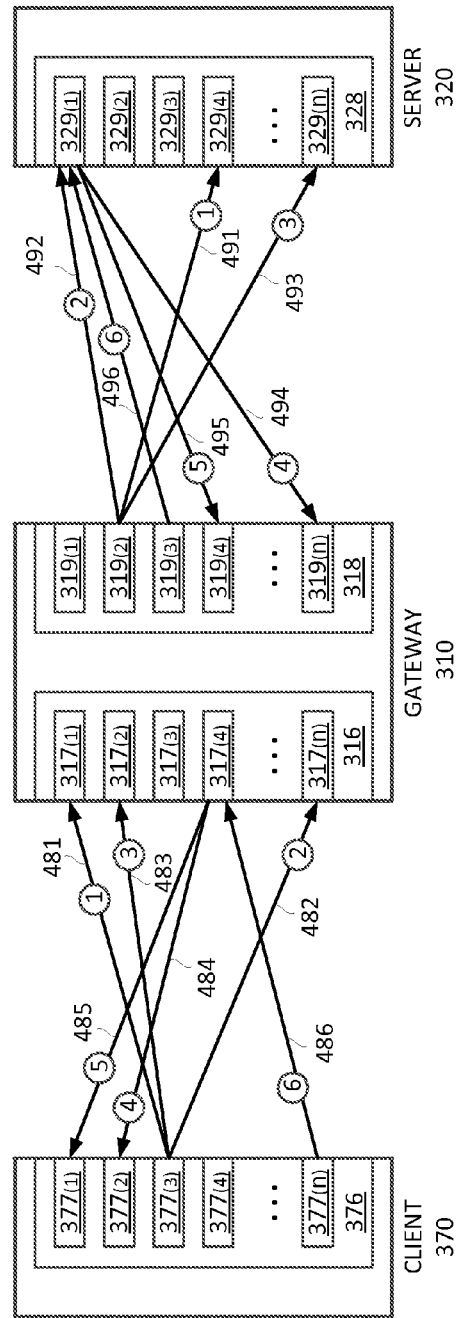

# US 8,909,556 B2

SECURITY GATEWAY COMMUNICATION

CROSS-REFERENCES TO RELATED APPLICATIONS

This application is a 371 of international application No. PCT/US2012/047687 filed Jul. 20, 2012, which is a nonprovisional of and claims the benefit of the filing date of U.S. Provisional Patent Application No. 61/510,023, filed Jul. 20, 2011, the contents of which are all hereby incorporated in its their entirety by reference for all purposes.

This application is related to commonly owned Patent Cooperation Treaty (PCT) Application No. PCT/US2012/047645, entitled "Mobile Banking System with Cryptographic Expansion Device," filed Jul. 20, 2012, the contents of which is hereby incorporated in its entirety by reference for all purposes.

BACKGROUND

Security concerns are often a stumbling block that hinders the wide adoption and growth of mobile banking. Most mobile devices lack the capability to securely send end-to-end encrypted communication. As a result, sensitive information, such as a Personal Identification Numbers (PINs) and Primary Account Numbers (PANs), might be sent in plaintext form, creating a vulnerability in which such sensitive information can be intercepted by malicious parties and be used for fraudulent purposes. While some security measures can be provided by mobile network operators, for example, to provide encryption capabilities at a base station, the protection provided by such solutions is still limited because the communication is still sent in plaintext form at some point during the transmission. Other solutions require re-provisioning of users' mobile devices, for example, by over the air (OTA) provisioning, and such solutions can be costly in terms of both deployment and operating costs. Consequently, mobile operators have to either pass this cost onto their customers or absorb it themselves. Thus, the total cost of ownership (TCO) is also often a stumbling block that prevents the uptake and growth of mobile banking. Without a cost-effective and efficient way to securely send and receive communication with mobile devices, mobile banking operators are destined to incur losses or fail to roll out their mobile banking services entirely.

While mobile network operators struggle to find a cost-effective and efficient solution to enable mobile devices to securely send encrypted communications, the security vulnerability with mobile banking is not just limited to the potential interception of over the air communications. The interface between a mobile network and a payment processing network can also be vulnerable to infiltration by malicious parties because the security protocols employed by the two networks are often different, and the identities of the devices on one network may not always be known to the devices on the other network. As a result, malicious parties can attempt to connect to one network at the interface by pretending to be part of the other network.

For example, one way network devices can establish connections with one another is to use a three-way handshake of synchronize and acknowledge messages. A network device can initiate a connection by sending a synchronize message to a target device. In response to the receiving the synchronize message, the target device sends back a synchronize-acknowledgement message. The initiating device then sends an acknowledge message to the target device. Upon receiving the acknowledge message, a connection is established between the two network devices. To infiltrate a system, a malicious party does not have to know the identity of the target device or the port of the target device that would accept a connection. The malicious party can perform a port scan to determine what devices are on a network and which ports of a device can accept connections by sending out random synchronize messages and waiting for a synchronize-acknowledgement message reply. When the malicious party receives a synchronize-acknowledgement message, the malicious party can learn the identity of the target device and obtain network parameters of the target device from the synchronize-acknowledgement message. The malicious party can then infiltrate the network of the target device by directing an attack to the target device.

Embodiments of the present invention address these and other problems individually and collectively.

BRIEF SUMMARY

Embodiments of the present invention disclose a gateway device and methods performed therein to prevent unauthorized client devices from connecting to the host network of the gateway device. According to various embodiments, the gateway device does not respond right away to an individual client message sent to the gateway device. Instead, the gateway device only responds to a predetermined sequence of the client messages, which is only known to the gateway device and authorized client devices. Because the gateway device will not respond to random client messages and the likelihood that an unauthorized device can correctly guess the predetermined sequence of the client messages is low, the risk of a malicious party being able to hack into the host network, for example, by using port scanning techniques, can be mitigated.

According to at least one embodiment, a method in a gateway device for establishing a communication channel between a client device communicatively coupled to a client interface of the gateway device and a server communicatively couple to a host interface of the gateway device includes receiving client messages on the client interface, and refraining from sending a client response message out the client interface until a predetermined sequence of client messages is received on the client interface. The gateway device also sends a predetermined sequence of server messages out the host interface. A communication channel to communicate user messages between the client device and the server is established after the gateway device receives both the predetermined sequence of client messages on the client interface; and a server response message on the host interface that is received only after the predetermined sequence of server messages has been sent by the gateway device.

According to at least one embodiment, a gateway device includes a client interface having client ports, a host interface having host ports, a processor coupled to the client interface and the host interface, and a machine readable storage medium storing executable program code that can be executed by the processor. The executable program code, when executed by the processor, causes the processor to receive client messages on the client interface from a client device, and to refrain from sending a client response message out the client interface until a predetermined sequence of client messages is received on the client interface. The executable program code can also cause the processor to send a predetermined sequence of server messages out the host interface to a server, and to establish a communication channel to communicate user messages between the client device and the server. The communication channel is established after the predetermined sequence of client messages is received on the client interface, and a server response message is received on the host interface, in which the server response message is received only after the predetermined sequence of server messages has been sent.

BRIEF DESCRIPTION OF THE DRAWINGS

FIG. 3 illustrates the exchange of messages for establish a communication channel, according to an exemplary embodiment of the present invention.

FIG. 4 illustrates the exchange of messages for establish a communication channel, according to another exemplary embodiment of the present invention.

DETAILED DESCRIPTION

Figure 1:
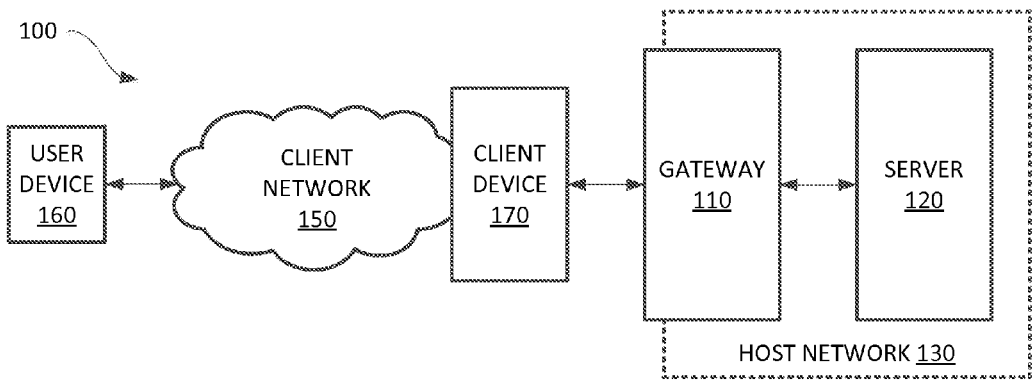
FIG. 1 illustrates a communication network environment according to one embodiment of the present invention.

Embodiments of the present invention disclose a gateway device and methods performed therein to prevent unauthorized client devices from connecting to the host network of the gateway device. According to various embodiments, the gateway device does not respond right away to an individual client message sent to the gateway device. Instead, the gateway device only responds to a predetermined sequence of the client messages, which is only known to the gateway device and authorized client devices. Because the gateway device will not respond to random client messages and the likelihood that an unauthorized device can correctly guess the predetermined sequence of the client messages is low, the risk of a malicious party being able to hack into the host network, for example, by using port scanning techniques, can be mitigated.

Furthermore, in some embodiments, the connection between the gateway device and a server of the host network can also be established using a predetermined sequence of server messages. This provides the gateway device with the ability to authenticate the devices on both ends of a communication to ensure that both the sender and the recipient of a communication being sent through the gateway device are authorized devices that are allowed to communicate with each other. In some embodiments, the communication channel that is established through the gateway device can be a secure communication channel that carries encrypted messages. The gateway device may provide cryptographic capabilities to decrypt incoming messages received from a device on one network and re-encrypt the messages or re-zone the messages for transmission on another network. The gateway device can also generate and verify message authentication codes or hash codes for the messages that the gateway device receives and/or transmits.

It should be understood that while some of the explanations and descriptions provide below may make specific references to a payment processing network or a wireless provider/mobile operator network, embodiments of the present invention are not limited to such networks. It should be appreciated that the explanations and descriptions provide below can be adapted for and be applicable to establishing communication channels with other types of communication networks.

As used herein, a "network" or a "communication network" is a group of interconnected devices that can communicate with one another either directly or through one or more intervening devices within the network. A network can be isolated from another network, and in such an environment, the devices of one network cannot communicate with the devices of the other network. A network can also be connected to another network, and in such an environment, the devices of one network may be able to communicate with the devices of the other network.

As used herein, a "communication channel" is a connection between two devices that allows the devices to exchange messages. The communication channel can include one or more intervening devices communicatively coupled between the two devices. Two devices can be coupled with each other without a communication channel between the two devices. For example, two devices can be coupled through firewall in which the firewall blocks all communications from one device to the other. In such a configuration, there is no communication channel between the two devices, even though one device is coupled to the other device.

As used herein, a "message" is a communication sent from a sender device to a recipient device. A "client message" or its variant is a message sent between a client device and a gateway device, and either device can be the sender device with the other device being the recipient device. A "server message" or its variant is a message sent between a host device and a gateway device, and either device can be the sender device with the other device being the recipient device. A "user message" is a message that is sent to or from a user device to communicate user data or information.

According to embodiments of the invention, each message can include, for example, in the header of the message, a source identifier, a destination identifier, a source port identifier, a destination port identifier, a synchronize flag, and an acknowledge flag. In some embodiments, each message can also include an initial sequence number and an acknowledge sequence number. The source identifier identifies the sender device of the message, and can be, for example, the IP address of the sender device. The destination identifier identifies the intended recipient device of the message, and can be, for example, the IP address of the recipient device. The source port identifier identifies the port number associated with the logical port of the sender device that the message is being sent from. The destination port identifier identifies the port number associated with the logical port of the recipient device that the message is being sent to.

When a message is described as being sent from port A of device X to port B of device Y, it should be understood that the message includes a source identifier identifying device X, a destination identifier identifying device Y, a source port identifier identifying the port number associated with port A of device X, and a destination port identifier identify the port number associated with port B of device Y. When a sequence of messages is described as having a sequence or order of source port identifiers, it should be understood that the messages in the sequence of messages are sent out from a sender device in a particular sequence or order of logical ports of the sender device. When a sequence of messages is described as having a sequence or order of destination port identifiers, it is meant that the messages in the sequence of messages are sent to a recipient device in a particular sequence or order of logical ports of the recipient device.

The synchronize flag and acknowledge flag of a message are used to identify whether a message is a synchronize message, a synchronize-acknowledgment message, or an acknowledge message. A synchronize message is a message that is used to initiate a communication channel with a device, and is identified by the synchronize flag being set and the acknowledge flag not being set. A synchronize-acknowledgment message is a message that is used to acknowledge the receipt of a synchronize message, and is identified by the synchronize flag being set and the acknowledge flag being set. An acknowledge message is a message that is used to acknowledge the receipt of a message other than a synchronize message (e.g., acknowledge receipt of a synchronize-acknowledgment message), and is identified by the synchronize flag being not set and the acknowledge flag being set.

In some embodiments, a message can also include an initial sequence number and an acknowledge sequence number that can be used to determine whether a message is being sent in response to a previous message. For example, a message can be sent from a sender device with an initial sequence number X, and a recipient device can send a reply message with an acknowledge sequence number of X+1 to indicate that the message is being sent in response to the message from the sender device that has the initial sequence number X. Thus, if a sender device sends multiple messages and only one message is received in reply, it is possible to determine which message from the sender device that the reply message is responsive to by comparing the acknowledge sequence number of the reply message with the initial sequence numbers of the messages from the sender device.

FIG. 1 illustrates a communication network environment 100 according to one embodiment. The communication network environment 100 includes a client network 150 (e.g., a mobile operator network, a wireless service provider network, or an internet protocol (IP) network providing connectivity to merchants, etc.) and a host network 130 (e.g., a payment processing network). Client network 150 is a communication network that provides communicative interconnectivity for a number of devices including a user device 160 and a client device 170. User device 160 is a personal communication device such as a mobile phone or other type of portable communication device (e.g., a personal digital assistant, a portable computing device such as a tablet computer or laptop, or a portable multi-functional device that can send and receive communications such as a portable media players/reader, a portable gaming device, etc.). User device 160 can also be a personal computer, an IP telephone, or other type of wired communication device that is communicatively coupled to client network 150.

Client device 170 is a network equipment of client network 150 that provides client network 150 with connectivity to other networks such as host network 130. For example, in an exemplary embodiment in which user device 160 is a mobile phone, client network 150 may include a short message service center (SMSC) to process SMS messages from user device 160. In such an embodiment, client device 170 can be a SMSC connector device that relays SMS messages between client network 150 and external networks. In other embodiments, client device 170 can be other type of network device of client network 150 that interfaces with external networks.

Host network 130 is a communication network that provides interconnectivity between a number of host devices including servers such as server 120 and gateway device 110. In an exemplary embodiment, host network 130 can be a secure network such as a payment processing network that implements a high level of security standards for data transmission and storage such as those in compliance with Payment Card Industry (PCI) security standards. Server 120 can be a server computer that is associated with a payment processing entity such an acquirer, an issuer, or other financial or banking institutions.

Gateway device 110 is a network device of host network 130 that provides an interface to connect host network 130 to external networks such as client network 150. Gateway device 110 can act as a firewall to prevent unauthorized access to host network 130 from devices on external networks. Gateway device 110 can apply access controls to determine which external network or device of an external network is allowed to communicate with other devices of host network 130 such as server 120. Furthermore, because the security protocols, and possibly communication protocols as well, can be different between host network 130 and external networks such as client network 150, gateway device 110 can also provide protocol conversion or protocol translation functions to ensure interoperability between devices in host network 130 and devices in external networks.

It should be appreciated that while gateway device 110 is shown as being communicatively coupled to client device 170 of client network 150 and server 120 of host network 130, gateway device 110 can also be communicatively coupled to other type of devices of client network 150 and other type of devices of host network 130. Furthermore, there can also be one or more intervening network devices between client device 170 and gateway device 110, and/or one or more intervening network devices between gateway device 110 and server 120.

Gateway Device

Figure 2:
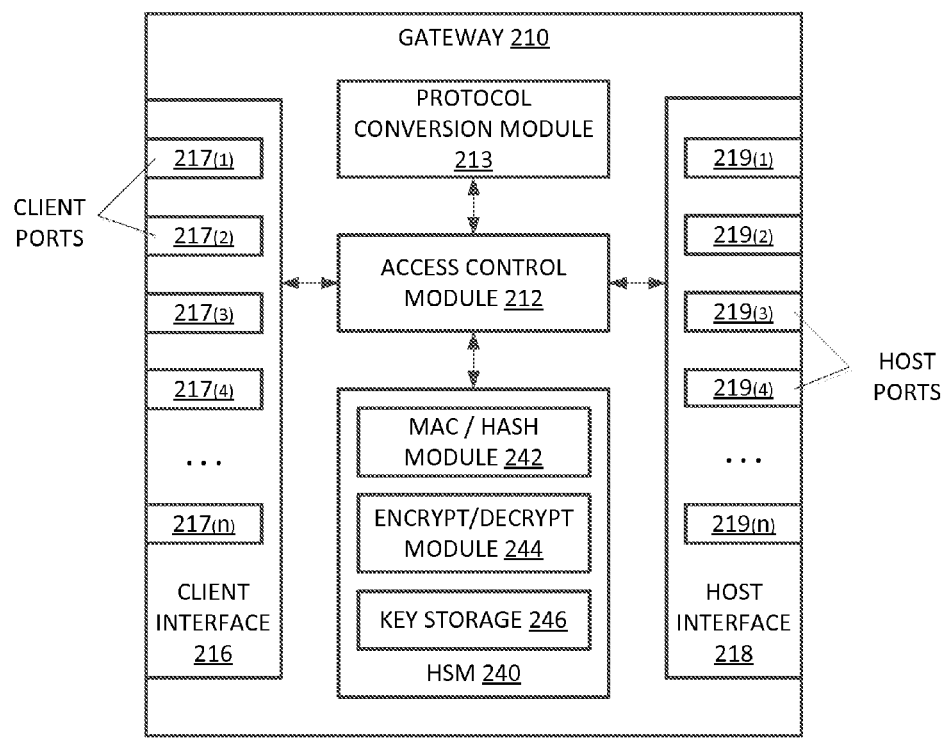
FIG. 2 illustrates a gateway device according to one embodiment of the present invention.

FIG. 2 illustrates a gateway device 210 according to various embodiments of the present invention. Gateway device 210 includes an access control module 212, a client interface 216 that interfaces to an external network such as client network 150, and a host interface 218 that interfaces to a host network of gateway device 210, such as host network 130. Gateway device 210 can also include a protocol conversion module 213 and a hardware security module (HSM) 240. Gateway device 210 can include one or more processors coupled to a memory storing machine executable code to implement one or more components of gateway device 210, for example, access control module 212 and/or protocol conversion module 213.

Client interface 216 includes multiple client ports $217_{(1)}$-$217_{(n)}$. It should be noted that client ports $217_{(1)}$-$217_{(n)}$ are logical ports, and client interface 216 can be configured with any number of client ports $217_{(1)}$-$217_{(n)}$. Each of client ports $217_{(1)}$-$217_{(n)}$ are associated with a port number on client interface 216, and each client port can be used to send and receive messages to and from a client device communicatively coupled client interface 216.

Host interface 218 includes multiple host ports $219_{(1)}$-$219_{(n)}$. It should be noted host ports $219_{(1)}$-$219_{(n)}$ are logical ports, and host interface 218 can be configured with any number of host ports $219_{(1)}$-$219_{(n)}$. Each of host ports $219_{(1)}$-$219_{(n)}$ are associated with a port number on host interface 218, and each host port can be to send and receive messages to and from a device of a host network that is communicatively coupled to host interface 217. It should be understood that in some embodiments, client interface 216 with client ports $217_{(1)}$-$217_{(n)}$ and host interface 218 with host ports $219_{(1)}$-$21_{(n)}$ can be implemented on the same physical interface.

Access control module 212 establishes, controls, and manages communication channels between a client device (e.g., client device 170) communicatively coupled to client interface 216 and a host device (e.g., server 120) communicatively coupled to host interface 218. Access control module can establish a connection between a client port and a host port through gateway device 210 to implement a communication channel between a client device and a host device. Access control module 212 includes a set of access rules stored therein that specifies which client devices of an external network is authorized to communicate with which host devices of the host network of gateway device 210. The set of access rules can also specify what type of traffic (i.e. communication protocol) that each communication channel being established through gateway device 210 can carry or support.

According to embodiments of the invention, the set of access rules include predetermined sequences of messages that gateway device 310 can use to authenticate client devices communicatively client interface 216 to determine if a client device is an authorized client device that is allowed to communicate with a host device. A predetermined sequence of messages can be specific to a client device, a type of client device, a group of client devices, or a client network. In other words, there can be a predetermined sequence of messages per client device, per type of client device, per group of client devices, or per client network. A predetermined sequence of message can be a predetermined sequence of messages that gateway device 210 expects to receive from an authorized client device before the client device is authenticated and allowed to communicate with a host device, or can be a predetermined sequence of messages that gateway device 210 sends out and expects an authorized client device to ignore until gateway device 210 has finished sending the entire predetermined sequence of messages, or can be a combination of both.

For example, if a sequence of messages received on client interface 216 from a client device of an external network matches the predetermined sequence of messages as specified for that client device in the access rules, then that client device can be authenticated and be determined to be an authorized client device. Access control module 212 can then establish a communication channel between that client device and a host device on the host network through gateway device 210. If the sequence of messages received on client interface 216 does not match the predetermined sequence of messages as specified in the access rules, then that client device can be determined to be an unauthorized client device, and access control module 212 can refuse to establish a communication channel for that client device, and deny that client device's access to the host network.

Alternatively or additionally, if gateway device 210 sends a predetermined sequence of messages to a client device, and the client device does not respond to the messages until gateway device 210 has finished sending the entire predetermined sequence of messages to that client device, then that client device can be authenticated and be determined to be an authorized client device. Access control module 212 can then establish a communication channel between that client device and a host device on the host network through gateway device 210. If that client device responds to a message from gateway device 210 before gateway device 210 has finished sending the entire predetermined sequence of messages, then that client device can be determined to be an unauthorized client device, and access control module 212 can refuse to establish a communication channel for that client device, and deny that client device's access to the host network.

The set of access rules can also include predetermined sequences of messages that gateway device 210 can use to authenticate host devices communicatively host interface 218 to determine if a host device is an authorized host device that is allowed to receive messages from and communicate with a client device. A predetermined sequence of message can be specific to a host device, a type of host device, or a group of host devices of the host network. In other words, there can be a predetermined sequence of messages per host device, per type of host device, or per group of host devices. A predetermined sequence of messages can be a predetermined sequence of messages that gateway device 210 expects to receive from an authorized host device before the host device is allowed to communicate with a client device, or can be a predetermined sequence of messages that gateway device 210 sends out and expects an authorized host device to ignore until gateway device 210 has finished sending the entire predetermined sequence of messages, or can be a combination of both.

For example, if a sequence of messages received on host interface 216 from a host device of the host network matches the predetermined sequence of messages as specified for that host device in the access rules, then that host device can be determined to be an authorized host device that is allowed to communicate with a client device. Access control module 212 can then establish a communication channel between that host device and a client device through gateway device 210. If the sequence of messages received on host interface 216 does not match the predetermined sequence of messages as specified in the access rules, then that host device can be determined to be an unauthorized host device that is not allowed to communicate with a client device, and access control module 212 can refuse to establish a communication channel between that host device and a client device.

Alternatively or additionally, if gateway device 210 sends a predetermined sequence of messages to a host device, and the host device does not respond to the messages until gateway device 210 has finished sending the entire predetermined sequence of messages to that host device, then that host device can be determined to be an authorized host device that can communicate with a client device. Access control module 212 can then establish a communication channel between that host device and a client device through gateway device 210. If that host device responds to a message from gateway device 210 before gateway device 210 has finished sending the entire predetermined sequence of messages, then that host device can be determined to be an unauthorized host device that is not allowed to communicate with a client device, and access control module 212 can refuse to establish a communication channel between that host device and a client device.

Each of the predetermined sequences of messages in the access rules can be defined by the message contents of the messages. For example, each predetermined sequence of messages can include one or more messages with a particular source and/or destination port identifiers as indicated in the header fields in the header of each message, and/or messages of one or more types (e.g., synchronize messages, synchronize-acknowledgment messages, and/or acknowledge messages, etc.) as indicated by flags in the header of the each message, and/or messages with a particular payload or data pattern.

Each of the predetermined sequences of messages can also be defined by the timing of the messages; that is, each predetermined sequence of messages can have timing restrictions as to when each message is received or sent relative to the other messages. For example, a predetermined sequence of messages can be a sequence of messages in which the last message is received within a time period of receiving the first message (e.g., entire sequence of messages received within 2 seconds). A predetermined sequence of messages can be a sequence of messages in which the each message is received within a time interval (e.g., a message every 200 milliseconds), or each message is received within a specific time period after the previous message (e.g., second message received within 100 milliseconds from the first message, third message received within 50 milliseconds of second message, etc.). A predetermined sequence of messages can also be a sequence of messages in which the gateway device expects an authorized device to ignore for a time period (e.g., client device should not respond until 2 seconds after receiving the last message).

Furthermore, each of the predetermined sequences of messages can be defined by a combination of message contents and timing, and each predetermined sequence of messages can have a different message content and/or differing timing than the other predetermined sequences of messages.

Gateway device 210 can also include protocol conversion module 213 that stores information about any number of communication protocols that gateway device can support, as well as the security protocols of external networks and the host network of gateway device 210. Protocol conversion module 213 can be used with access control module 212 to convert messages sent on communication channels between client interface 216 and host interface 218 from one communication protocol to another communication protocol to provide interoperability between client devices of an external network and host devices of the host network of gateway device 210.

Protocol conversion module 213 can also be used in conjunction with access control module 212 and HSM 240 to implement security protocols to adapt messages from an external network to conform to the security protocols of the host network of gateway device 210. For example, in some embodiments, the security protocol of the host network may specify that all messages being transmitted in the host network are to be protected by message authentication codes and/or hash codes. Protocol conversion module 213 can be used in conjunction with access control module 212 and HSM 240 to generate message authentication codes and/or hash codes, and to append them to messages received from an external network if messages from the external network lack message authentication codes and/or hash codes.

In some embodiments, gateway device 210 also includes a Federal Information Processing Standards (FIPS) compliant HSM 240. HSM 240 can include one or more cryptoprocessors and memory storing machine executable code implementing an encryption/decryption module 244, a message authentication code/hash module 242, and a cryptographic key storage 246. HSM 240 provides secure key management related functions such as cryptographic key generation, configuration of security limits and capabilities of the cryptographic keys, cryptographic keys backup and recovery, secure cryptographic keys storage, and revocation and destruction of cryptographic keys. HSM 240 can also provide a tamper-resistant mechanism that provides a high risk of destroying components in HSM 240 and the cryptographic keys stored therein, if any attempt external to gateway 210 is made to access or tamper with HSM 240.

Encryption/decryption module 244 can store and execute various encryption algorithms such as Advance Encryption Standard (AES), Data Encryption Standard (DES), Triple Data Encryption Standard/Algorithm (TDES/TDEA), Blowfish, Serpent, Twofish, International Data Encryption Algorithm (IDEA), Rivest, Shamir, & Adleman (RSA), Digital Signature Algorithm (DSA), Tiny Encryption Algorithm (TEA), extended TEA (XTEA), and/or other cryptographic or encryption algorithms. In response to encryption and decryption requests from access control module 212, encryption/decryption module 244 can look up the requested encryption algorithm, obtain any necessary cryptographic keys from cryptographic key storage 246, perform the encryption/decryption request, and reply to access control module 212 with the encrypted/decrypted data.

Cryptographic key module 246 stores the set of cryptographic or encryption keys that are used in the various encryption algorithms performed by encryption/decryption module 244. The encryption keys can include symmetric keys and/or asymmetric keys. Cryptographic key module 246 can also store a set of seed keys that are used to initialize the encryption/decryption module 244 in certain encryption algorithms such as AES, or used to generate random numbers used in certain encryption algorithms such as RSA and DSA. The encryption keys and/or seed keys stored in cryptographic key module 246 cannot be altered by an external source without a master key that was used during manufacturing of HSM 240.

HSM 240 can also include message authentication code (MAC)/hash module 242 to generate and verify MACs and/or hashes for messages sent to and from gateway device 210. A MAC or a hash can be generated for a message or a portion of the message such that the recipient can verify the message's data integrity and authenticity. In some embodiments, messages received from an external network may include MAC or hash codes. MAC/hash module 242 can verify the MAC or hash codes of the received messages before sending the messages to a server in the host network of gateway device 210. If the MAC or hash code of a message cannot be verified, the message can be discarded to prevent unauthorized messages from entering the host network.

It should be appreciated that in some embodiments, gateway device 210 may or may not include HSM 240, and that one or more components of HSM 240 can be implemented using the processor and memory of gateway device 210. For example, in an exemplary embodiment, gateway device 210 may include a MAC/hash module 242, which is not part of a HSM, but is implemented with the processor and memory of gateway device 210, and/or gateway device 210 may include an encryption/decryption module 244, which is not part of a HSM, but is implemented with the processor and memory of gateway device 210.

Exemplary Embodiment Using Sequence of Synchronize Messages to Establish a Communication Channel For ease of understanding, the process of establishing a communication channel between a client device of a client network and a host device of a host network through a gateway device will now be described with reference to a particular embodiment. It should be understood that the specific sequence of messages described according to this exemplary embodiment is just one example of using a sequence of messages to establishing a communication channel in accordance with embodiments of the invention, and that other embodiments can use any other sequence of messages disclosed herein.

FIG. 3 shows a diagram illustrating the exchange of messages to establish a communication channel between a client device 370 of a client network and a server 320 of a host network through gateway device 310, according to an exemplary embodiment. The circled numbers in FIG. 3 indicate the order in which the messages are transmitted. It should be understood that in various embodiments, the exchange of messages between client device 370 and gateway device 310 can occur independently of, and can also occur concurrently with, the exchange of messages between gateway device 310 and server 320, and that a communication channel between client device 370 and server 320 is established after both client device 370 and server 320 are authenticated and determined to be authorized devices.

Client device 370 is part of a client network that is external to the host network of gateway device 310. Client device 370 includes a device port interface 376 that can have any number of logical device ports $377_{(1)}$-$377_{(n)}$ to interface with other devices (e.g., gateway device 310), and each of device ports $377_{(1)}$-$377_{(n)}$ is associated with a device port number on device port interface 376. Gateway device 310 (e.g., gateway device 210 of FIG. 2) and server 320 are part of a host network. Gateway device 310 includes a client interface 316 that includes multiple logical client ports $317_{(1)}$-$317_{(n)}$ to interface with client devices of a client network (e.g., client device 370), and a host interface 318 that includes multiple logical host ports $319_{(1)}$-$319_{(n)}$ to interface with host devices of the host network (e.g., server 320). Each of client ports $317_{(1)}$-$317_{(n)}$ is associated with a client port number on client interface 316, and each of host ports $319_{(1)}$-$319_{(n)}$ is associated with a host port number on host interface 319. Sever 320 includes a server port interface 328 that has multiple logical server ports $329_{(1)}$-$329_{(n)}$ to interface with other devices of the host network (e.g., gateway device 310). Each of server ports $329_{(1)}$-$329_{(n)}$ is associated with a server port number on server port interface 328.

Client device 370 initiates the process of establishing a communication channel to a host device (e.g., server 320) of the host network by sending a client synchronize message to gateway device 310. Gateway device 310 is configured to refrain from responding to client synchronize messages received from a client device of an external client network unless a predetermined sequence of client synchronize messages has been received. The predetermined sequence of client synchronize messages is known only to gateway device 310 and authorized devices (e.g., client device 370) that are allowed to communicate with a host device (e.g., sever 320) of the host network. Because gateway device 310 does not respond to client synchronize messages received from a client device of an external client network unless the predetermined sequence of client synchronize messages has been received, it is unlikely that an unauthorized client device would be able to discover and connect to gateway device 310 by sending out random synchronize messages using port scanning techniques.

In some embodiments, the predetermined sequence of client synchronize messages can be a sequence of client synchronize messages that are received on the client ports of client interface 316 in a predetermined client port order. In other words, the predetermined sequence of client synchronize messages can be a sequence of client synchronize messages with a predetermined order of destination port identifiers. By way of example, the predetermined sequence of client synchronize messages can be as follows: (1) a client synchronize message received on client port $317_{(1)}$ of gateway device 310; (2) a client synchronize message received on client port $317_{(n)}$ of gateway device 310; and (3) a client synchronize message received on client port $317_{(2)}$ of gateway device 310. It should be understood that the predetermined sequence of client synchronization messages in other embodiments can include any number of client synchronization messages and can be received in any order of client ports.

Client device 370 initiates the process of establishing a communication channel to gateway 310 by sending client synchronize message 381 to gateway device 310. Client synchronize message 381 includes a source port identifier with the device port number associated with device port $377_{(3)}$ of client device 370, and a destination port identifier with the port number associated with client port $317_{(1)}$ of gateway device 310. It should be noted that according to this particular embodiment, the predetermined sequence of client synchronize messages does not specify that the client synchronize messages are to be sent from any particular device port of client device 370. Thus, client synchronize message 381 can be sent from any of device ports $377_{(1)}$-$377_{(n)}$ of client device 370.

When gateway device 310 receives client synchronize message 381 on client port $317_{(1)}$, gateway device 310 does not initially respond to client synchronize message 381, because the predetermined sequence of client synchronize has not yet been received. Client device 370 then sends a second client synchronize message 382 from device port $377_{(3)}$ to client port $317_{(n)}$ of gateway device 310. Gateway device 310 does not response to the second client synchronize message 382 either, because the entire predetermined sequence of client synchronize messages that is used to authenticate client device 370 still has not yet been received by gateway device 310.

Next, client device 370 sends a third client synchronize message 383 from device port $377_{(3)}$ of client device 370 to client port $317_{(2)}$ of gateway device 310. When gateway device 310 receives client synchronize message 383, gateway device 310 can authenticate client device 370 by comparing the sequence of the received client synchronize messages 381, 382, and 383 with the predetermined sequence of client synchronize messages stored in the access rules of gateway device 310. If the predetermined sequence of client synchronize messages that gateway device 310 expects to receive from an authorized client device was correctly received from client device 370, then gateway device 310 determines that client device 370 is an authorized client device that is allowed to communicate with a host device (e.g., server 320) of the host network.

Gateway device 310 then replies to client device 370 with a client synchronize-acknowledgment message 384. Client synchronize-acknowledgment message 384 includes a destination port identifier with the device port number associated with device port $377_{(3)}$ of client device 370 from which the sequence of client synchronize messages originated, and a source port identifier with the port number associated with client port $317_{(4)}$ of gateway device 310. In some embodiments, the source port identifier of client synchronize-acknowledgment message 384 can be used by the gateway device 310 to indicate to client device 370 which of the client ports of gateway device 310 will accept the connection to establish a communication channel for client device 370. Upon receiving client synchronize-acknowledgment message 384 on device port $377_{(3)}$, client device 370 sends a client acknowledge message 385 from device port $377_{(3)}$ to client port $317_{(4)}$ of gateway device 310. When gateway device 310 receives client acknowledge message 385, client device 370 is authenticated as an authorized client device on client port $317_{(4)}$ of gateway device 310, and a communication channel can be established between client device 370 and server 320 pending the authentication of server 320.

According to some embodiments of the invention, the communication channel between gateway device 310 and server 320 can also be established using a predetermined sequence of messages that is only known to gateway device 310 and authorized host devices (e.g., server 320) that are allowed to communicate with a client device. This provides gateway device 310 with the ability to authenticate the devices on both ends of a communication to ensure that both the sender and the recipient of a communication being transmitted through gateway device 310 are devices that are authorized to communicate with each other.

In some embodiments, the communication channel between gateway device 310 and server 320 is established using a predetermined sequence of server synchronize messages that are sent from host interface 318 of gateway device 310 to server port interface 328 of server 320 in a predetermined server port order. In other words, the predetermined sequence of server synchronize messages can be a sequence of server synchronize messages with a predetermined sequence of destination port identifiers. By way of example, the predetermined sequence of server synchronize messages can be as follows: (1) a server synchronize message sent to server port $329_{(n)}$ of server 320; (2) a server synchronize message sent to server port $329_{(4)}$ of server 320; and (3) a server synchronize message sent to server port $329_{(n)}$ of server 320. It should be understood that the predetermined sequence of server synchronization messages in other embodiments can include a different number of server synchronization messages and can be received in a different order of server ports.

Gateway device 310 initiates the process of establishing a communication channel to server 320 by sending server synchronize message 391 to gateway device 310. Server synchronize message 391 includes a source port identifier with the host port number associated with host port $319_{(2)}$ of gateway device 310, and a destination port identifier with the server port number associated with server port $329_{(n)}$ of server 320. When server 320 receives server synchronize message 391 on server port $329_{(n)}$, server 320 does not initially respond to server synchronize message 391. Gateway device 310 then sends a second server synchronize message 392 from host port $319_{(2)}$ to server port $329_{(4)}$ of server 320. Because the predetermined sequence of server synchronize messages that server 320 expects from gateway device 310 has not yet been received, server 320 does not response to the second client synchronize message 392 either.

Next, gateway device 310 sends a third server synchronize message 393 from host port $319_{(2)}$ to client port $329_{(n)}$ of server 320. When server 320 receives server synchronize message 393, server 320 replies to gateway device 310 with a synchronize-acknowledgment message 394, because the expected predetermined sequence of server synchronize messages was correctly received from gateway device 310. The predetermined sequence of server synchronize messages can also be used by gateway device 310 to authenticate server 320 because an authorized host device would not respond to any of the server synchronize messages until the entire predetermined sequence of server synchronize messages has been sent from gateway device 310. Thus, if gateway device 310 receives a server synchronize-acknowledgment message from a host device before gateway device 310 has finished sending the entire predetermined sequence of server synchronize messages, then gateway device 310 can determined that the host device is not an authorized host device, because an authorized host device would not send the server synchronize-acknowledgment message prior to receiving the entire predetermined sequence of server synchronize messages.

Referring back to FIG. 3, server synchronize-acknowledgment message 394 includes a destination port identifier with the host port number associated with host port $319_{(2)}$ of gateway device 320 from which the sequence of server synchronize messages originated, and a source port identifier with the server port number associated with server port $329_{(n)}$ of server 320. In some embodiments, the source port identifier of server synchronize-acknowledgment message 394 can be used by server 320 to indicate to gateway device 310 which of the server ports of server 320 will accept the connection to gateway device 310 to establish a communication channel. Upon receiving server synchronize-acknowledgment message 394 on host port $319_{(2)}$, gateway device 310 sends a server acknowledge message 395 from host port $319_{(2)}$ to server port $329_{(2)}$ of server 320. Server 320 is then authenticated as an authorized host device on host port $319_{(2)}$ of gateway device 310, and a communication channel can be established between client device 370 and server 320 pending the authentication of client device 370.

Once both client device 370 and server 320 are authenticated by gateway device 310 to be authorized devices that are allowed to communicate with one another, gateway device 310 establishes a communication channel between client device 370 and server 320 through gateway device 310. Client device 370 can then send and receive messages to and from server 320 on the established communication channel through gateway device 310.

In the above example, the predetermined sequence of messages used for authenticating the devices and establishing the communication channel between the devices is a predetermined sequence of synchronize messages. In other embodiments, the predetermined sequence of messages used for authenticating the devices and for establishing the communication channel between the devices can alternatively or additionally include a predetermined sequence of synchronize-acknowledgment messages and/or a predetermined sequence of acknowledgment messages.

Exemplary Embodiment Using Sequence of
Synchronize Messages and Sequence of
Synchronize-Acknowledgment Messages to
Establish a Communication Channel FIG. 4 shows a diagram illustrating the exchange of messages to establish a communication channel between a client device 370 of a client network and a server 320 of a host network through gateway device 310, according to another exemplary embodiment. In this particular embodiment, the predetermined sequence of messages to establish a communication channel between devices include both a predetermined sequence of synchronize messages and a predetermined sequence of synchronize-acknowledgment messages. By way of example, the predetermined sequence of messages used for authenticating client device 370 can be as follows: (1) a client synchronize message received on client port $317_{(1)}$ of gateway device 310; (2) a client synchronize message received on client port $317_{(n)}$ of gateway device 310; (3) a client synchronize message received on client port $317_{(2)}$ of gateway device 310; (4) a client synchronize-acknowledgment message sent to device port $377_{(2)}$ of client device 370; and (5) a client synchronize-acknowledgment message sent to device port $377_{(1)}$ of client device 370.

According to this particular embodiment, client device 370 is authenticated to be an authorized client device if the above sequence of client synchronize messages is received and if client device 370 does not respond to a client synchronize-acknowledgment message until the entire predetermined sequence of client synchronize-acknowledgment messages has been sent to client device 370. If any additional intervening messages between client device 370 and gateways device 310 is transmitted during the above sequence of messages, or if the entire sequence of messages (both the sequence of client synchronize messages and the sequence of client synchronize-acknowledgment messages) is not received by the corresponding devices, then the gateway device 310 may deny client device 370 access to the host network of gateway device 310. It should be understood that the predetermined sequence of messages is not limited to the specific example given above, and that in other embodiments, the predetermined sequence of messages can include a different number of client synchronize messages received on a different order of client ports and/or a different number of client synchronize-acknowledgement messages sent to a different order of device ports. Furthermore, the predetermined sequence of messages can alternatively or additionally include a predetermined sequence of client acknowledgement messages.

Client device 370 initiates the process of establishing a communication channel to gateway 310 by sending client synchronize message 481 to gateway device 310. Client synchronize message 481 includes a source port identifier with the device port number associated with device port $377_{(3)}$ of client device 370, and a destination port identifier with the client port number associated with client port $317_{(1)}$ of gateway device 310. When gateway device 310 receives client synchronize message 481 on client port $317_{(1)}$, gateway device 310 does not initially respond to client synchronize message 481. Client device 370 then sends a second client synchronize message 482 from device port $377_{(3)}$ to client port $317_{(n)}$ of gateway device 310. Because the predetermined sequence of client synchronize messages has not yet been received by gateway device 310, gateway device 310 does not response to the second client synchronize message 482 either.

Next, client device 370 sends a third client synchronize message 483 from device port $377_{(3)}$ of client device 370 to client port $317_{(2)}$ of gateway device 310 in accordance with the predetermined sequence of client synchronize messages. When gateway device 310 receives client synchronize message 483, in response to having received the predetermined sequence of client synchronize messages, gateway device 310 replies to client device 370 with a client synchronize-acknowledgment message 384. Client synchronize-acknowledgment message 384 includes a source port identifier with the client port number associated with client port $317_{(4)}$ of gateway device 310, which can be used by gateway device 310 to indicate to client device 370 which client port of gateway device 310 will accept the connection from client device 370 to establish a communication channel. Client synchronize-acknowledgment message 384 also includes a destination port identifier with the device port number associated with device port $377_{(2)}$ of client device 370 in accordance with the predetermined sequence of client synchronize-acknowledgment messages of this exemplary embodiment.

Upon receiving client synchronize-acknowledgment message 384 on device port $377_{(2)}$, client device 370 does not initially respond to client synchronize-acknowledgment message 384, because the predetermined sequence of client synchronize-acknowledgment message has not yet been received by client device 370. If gateway device 310 receives an client acknowledgement message from a client device in response to client synchronize-acknowledgment message 384 before gateway device sends client synchronize-acknowledgment message 385, gateway device 310 can determine that the client device is not an authorized client device, because an authorized client device would not send a client acknowledge message until the predetermined sequence of client synchronize-acknowledgment messages have been received.

Next, gateway device sends client synchronize-acknowledgment message 485 from client port $317_{(4)}$ to device port $377_{(1)}$ of client device 370 in accordance with the predetermined sequence of client synchronize-acknowledgment messages. Upon receiving client synchronize-acknowledgment message 485, in response to having received the predetermined sequence of client synchronize-acknowledgment messages, client device 370 replies to gateway device 310 with client acknowledge message 486. Client acknowledge message 486 includes a source port identifier with the device port number associated with device port $377_{(n)}$ of client device 370, which can be used by client device 370 to indicate to gateway device 310 which device port of client device 370 will be used for the connection to gateway device 310 to establish a communication channel. Client acknowledge message 486 also includes a destination port identifier with the client port number associated with client port $317_{(4)}$ of gateway device 310 from which client acknowledge messages 486 and 487 originated. When gateway device 310 receives client acknowledge message 486, client device 370 is authenticated as an authorized client device on client port $317_{(4)}$ of gateway device 310, and a communication channel can be established between client device 370 and server 320 pending the authentication of server 320.

According to some embodiments of the invention, the communication channel between gateway device 310 and server 320 can be established using a predetermined sequence of messages that includes a predetermined sequence of server synchronize messages, and/or a predetermined sequence of server synchronize-acknowledgment messages, and/or a predetermined sequence of server acknowledge messages. Authenticating server 320 provides gateway device 310 with the ability to authenticate the devices on both ends of a communication to ensure that both the sender device and the recipient device of a communication being transmitted through gateway device 310 are devices that are authorized to communicate with each other.

In the exemplary embodiment as shown in FIG. 4, the predetermined sequence of messages to establish a communication channel between gateway device 310 and server 320 includes both a predetermined sequence of synchronize messages and a predetermined sequence of synchronize-acknowledgment messages. By way of example, the predetermined sequence of messages used for authenticating server 320 can include the following: (1) a server synchronize message received on sever port $329_{(4)}$ of server 320; (2) a server synchronize message received on server port $329_{(1)}$ of server 320; (3) a server synchronize message received on server port $329_{(n)}$ of server 320; (4) a server synchronize-acknowledgment message received on host port $319_{(n)}$ of gateway device 310; and (5) a server synchronize-acknowledgment message received on host port $319_{(4)}$ of gateway device 310.

In this exemplary embodiment, server 320 is authenticated to be authorized host device to communicate with a client device if server 320 does not respond to a server synchronize message until the entire predetermined sequence of server synchronize messages has been sent to server 320, and if the above predetermined sequence of server synchronize-acknowledgment messages is received from server 320. If any additional intervening messages between gateways device 310 and server 320 is transmitted during the above sequence of messages, or if the entire sequence of messages (both the sequence of server synchronize messages and the sequence of server synchronize-acknowledgment messages) is not received by the corresponding devices, then the gateway device 310 may deny server 320 from sending or receiving messages to and from client device 370. It should be understood that the predetermined sequence of messages is not limited to the specific example given above, and that in other embodiments, the predetermined sequence of messages can include a different number of server synchronize messages sent to a different order of server ports on server 320 and/or a different number of server synchronize-acknowledgement messages received on a different order of host ports on gateway device 310. Furthermore, the predetermined sequence of messages can alternatively or additionally include a predetermined sequence of server acknowledgement messages.

Gateway device 310 initiates the process of authenticating server 320 by sending server synchronize message 491 to server 320. Server synchronize message 491 includes a source port identifier with the host port number associated with host port $319_{(2)}$ of gateway device 310, and a destination port identifier with the server port number associated with server port $329_{(4)}$ of server 320 in accordance with the predetermined sequence of server synchronize messages of this exemplary embodiment. When server 320 receives server synchronize message 491 on server port $329_{(4)}$, server 320 does not initially respond to server synchronize message 491. Gateway device 310 then sends a second client synchronize message 492 from host port $319_{(2)}$ to server port $329_{(n)}$ of server 320 according to the predetermined sequence of server synchronize messages. Because not all of the messages in the predetermined sequence of server client synchronize messages has been received by server 320, server 320 does not response to this second server synchronize message 492 either.

Next, gateway device 310 sends a third server synchronize message 493 from host port $319_{(2)}$ to server port $329_{(n)}$ of server 320. When server 320 receives server synchronize message 493, in response to having received the predetermined sequence of server synchronize messages, server 320 replies to gateway device 310 with a server synchronize-acknowledgment message 494. If gateway device 310 receives an server synchronize-acknowledgement message from a host device (e.g., server of host network) in response to server synchronize message 491 or 492 before gateway device 310 sends server synchronize message 493, gateway device 310 can determine that the host device is not an authorized host device, because an authorized host device would not send a server synchronize-acknowledgement message until the predetermined sequence of server synchronize messages have been received.

Referring back to FIG. 4, server synchronize-acknowledgment message 394 includes a source port identifier with the server port number associated with server port $329_{(1)}$ of server 320, which can be used by server 320 to indicate to gateway device 310 which server port of server 320 will accept the connection with gateway device 310 to establish a communication channel. Server synchronize-acknowledgment message 394 also includes a destination port identifier with the host port number associated with host port $319_{(n)}$ of gateway device 310 in accordance with the predetermined sequence of server synchronize-acknowledgment messages in this exemplary embodiment.

Upon receiving server synchronize-acknowledgment message 394 on host port $319_{(n)}$, gateway device 310 does not initially respond to synchronize-acknowledgment message 394, because the predetermined sequence of server synchronize-acknowledgment messages has not yet been received by gateway device 310. Next, server 320 sends a second synchronize-acknowledgment message 495 from server port $329_{(1)}$ to host port $319_{(4)}$ of gateway device 310 in accordance with the predetermined sequence of server synchronize-acknowledgment messages. Upon receiving server synchronize-acknowledgment message 495, in response to having received all the messages in the predetermined sequence of server synchronize-acknowledgment messages, gateway device 310 replies to server 320 with server acknowledge message 496. It should be noted that if gateway device 310 never receives server synchronize-acknowledgment message 495, or fails to receive it within a predetermined amount of time, then gateway device 310 can determine that the server may be an unauthorized host device and refuse to establish a communication channel to server 320.

Referring back to FIG. 4, server acknowledge message 496 includes a source port identifier with the port number associated with host port $319_{(3)}$ of gateway device 310, which can used by gateway device 310 to indicate to server 320 which host port of gateway device 310 will accept the connection to server 320 to establish a communication channel. Server acknowledge message 496 also includes a destination port identifier with the server port number associated with server port $329_{(1)}$ of server 320 from which server synchronize-acknowledgment messages 494 and 495 originated. Server 320 is then authenticated as an authorized host device on host port $319_{(2)}$ of gateway device 310, and a communication channel can be established between client device 370 and server 320 pending the authentication of client device 370.

Once both client device 370 and server 320 are authenticated by gateway device 310 to be authorized devices that are allowed to communicate with one another, gateway device 310 establishes a communication channel between client device 370 and server 320 through gateway device 310. Client device 370 can then send and receive messages to and from server 320 on the established communication channel through gateway device 310.

According to various embodiments, the communication channel that is established between client device 370 and server 320 can be a secure communication channel that carries encrypted user messages or user messages protected by message authentication codes or hash codes. This provides an added level of security to ensure only valid messages originating from a user device is sent to server 320 from client device 370. For example, user messages from a user device can be received by client device 370 in an encrypted form and/or have MAC/hash codes appended to the user messages. When client device 370 forwards these user messages to gateway device 310, gateway device 310 does not forward these user messages to server 320 automatically without inspection. Instead, gateway device 310 can decrypt the user messages using a symmetric or asymmetric cryptographic key that corresponds to the cryptographic key used by the user device to encrypt the messages to determine if the user messages originated from an authorized user device. If the decryption reveals user messages that are in an unexpected or unknown format, gateway device 310 can discard the user messages to prevent unauthorized or unwanted messages from reaching server 320. Gateway device 310 can also generate MAC/hash codes on the received user messages and verify the MAC/hash codes in the received user messages matches the generate codes. If the generated MAC/hash codes do not match the received MAC/hash codes, gateway device 310 can discard the user messages to prevent unauthorized or unwanted messages from reaching server 320. Furthermore, gateway device 310 can also re-zone the user messages for transmission in the host network by re-encrypting the user messages and/or adding or replacing the MAC/hash codes of the user messages in accordance with the security protocols of the host network.

In an exemplary embodiment, server 320 can be a server of a financial or banking entity and the host network is a payment processing network. In one embodiment, client device 310 can be communicatively coupled to a wireless provider network or a mobile operator network, and the user messages that client device 310 transmits to server 320 are user messages that originated from a mobile device such as a mobile phone as Short Message Service (SMS) messages or Unstructured Supplementary Service Data (USSD) messages. In another embodiment, the client device 310 can be communicatively coupled to a merchant's network, and the user messages that client device 310 transmits to server 320 are user messages that originated from a mobile device such as a mobile phone as Radio Frequency (RF) communications or Near Field Communication (NFC) communications that the mobile device has sent to a point-of-sale (POS) terminal of a merchant. The user messages in these and other embodiments can be messages that are associated with payment transactions such as payment transaction/authorization requests.

Additional Embodiments of Sequence of Messages

While in the above description of various embodiments, the predetermined sequence of messages has been described in terms of a sequence of messages being received on a predetermined order of destination ports, or in other words, a sequence of messages having a predetermined order of destination port identifiers, the predetermined sequence of messages used to authenticate devices is not limited as such. In other embodiments, the predetermined sequence of messages can alternatively or additionally include a predetermined order of source port identifiers or be sent from a predetermined order of source ports.

Figure 5A:
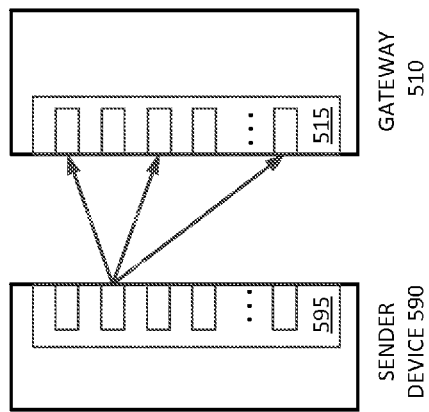
FIG. 5A illustrates a sequence of messages, according to one embodiment of the present invention.
Figure 5B:
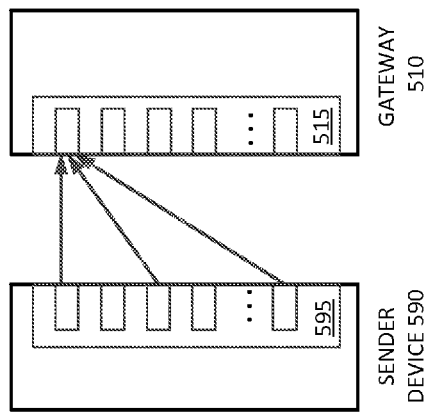
FIG. 5B illustrates a sequence of messages, according to another embodiment of the present invention.
Figure 5C:
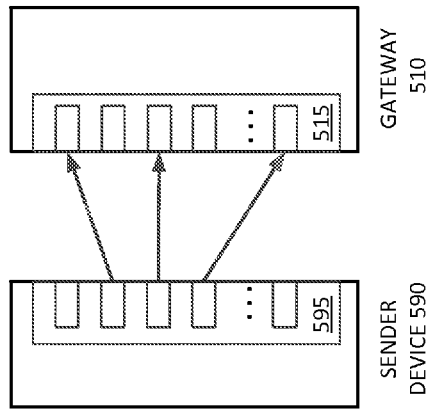
FIG. 5C illustrates a sequence of messages, according to a further embodiment of the present invention.

FIGS. 5A-C each illustrates a predetermined sequence of messages that can be used by gateway device 510 to authenticate a sender device 590, according to various embodiments. While the predetermined sequence of messages is shown to include three messages, it should be appreciated that the predetermined sequence of messages can include any number of messages, for example, two or more messages, five or more messages, or ten or more messages. Sender device 590 can be a client device of a client network, a host device such as a server of the host network of gateway device 510, or other type of device attempting to establish a communication channel through gateway device 510. Sender device 590 includes a sender port interface 595 with logical sender ports for interfacing to gateway device 510. Gateway device 510 can be a gateway device according to any of the embodiments described above. Gateway device 510 includes at least one gateway port interface 515 with logical gateway ports for interfacing to sender device 590. In embodiments in which sender device 590 is a client device of a client network, gateway port interface 515 can be a client port interface, and the gateway ports can be logical client ports. In embodiments in which sender device 590 is a server or other type of device in the host network, gateway port interface 515 can be a host port interface, and the gateway ports can be logical host ports.

FIG. 5A illustrates a predetermined sequence of messages that is sent from sender device 590 to gateway device 510, according to one embodiment. The predetermined sequence of messages can be, for example, a predetermined sequence of client synchronize messages, a predetermined sequence of server synchronize-acknowledgment messages, or a predetermined sequence of client acknowledge messages. The predetermined sequence of messages is sent from the same sender port of sender device 590, which can be any one of the sender ports on sender port interface 595, and is sent to and received on a predetermined order of gateway ports on gateway device 510. The predetermined order of gateway ports can be any order of gateway ports, and more than one message can be sent to the same gateway port. Thus, according to the embodiment as shown in FIG. 5A, a predetermined sequence of messages can include messages that have the same source port identifier identifying a sender port of send device 590, and a predetermined order of destination port identifiers identifying a predetermined order of gateway ports of gateway device 510.

FIG. 5B illustrates a predetermined sequence of messages that is sent from sender device 590 to gateway device 510, according to another embodiment. The predetermined sequence of messages can be, for example, a predetermined sequence of client synchronize messages, a predetermined sequence of server synchronize-acknowledgment messages, or a predetermined sequence of client acknowledge messages. The predetermined sequence of messages is sent from a predetermined order of sender ports of sender device 590. The predetermined order of sender ports can be any order of sender ports on sender port interface 595, and more than one message can be sent from the same sender port. Each message in the predetermined order of messages is sent to and received on the same gateway port of gateway device 510, which can be any one of the gateway ports on gateway port interface 595 of gateway device 510. Thus, according to the embodiment as shown in FIG. 5B, a predetermined sequence of messages can include messages that have a predetermined order of source port identifiers identifying a predetermined order of sender ports of sender device 590, and the same destination port identifier identifying a gateway port of gateway device 510.

FIG. 5C illustrates a predetermined sequence of messages that is sent from sender device 590 to gateway device 510, according to a further embodiment. The predetermined sequence of messages can be, for example, a predetermined sequence of client synchronize messages, a predetermined sequence of server synchronize-acknowledgment messages, or a predetermined sequence of client acknowledge messages. The predetermined sequence of messages is sent from a predetermined order of sender ports of sender device 590. The predetermined order of sender ports can be any order of sender ports on sender port interface 595, and more than one message can be sent from the same sender port. The predetermined sequence of messages is sent to and received on a predetermined order of gateway ports of gateway device 510. The predetermined order of sender gateway can be any order of gateway ports on gateway port interface 515, and more than one message can be sent to and received on the same gateway port. Thus, according to the embodiment as shown in FIG. 5C, a predetermined sequence of messages can include messages that have a predetermined order of source port identifiers identifying a predetermined order of sender ports of sender device 590, and a predetermined order of destination port identifiers identifying a predetermined order of gateway ports of gateway device 510.

Figure 6A:
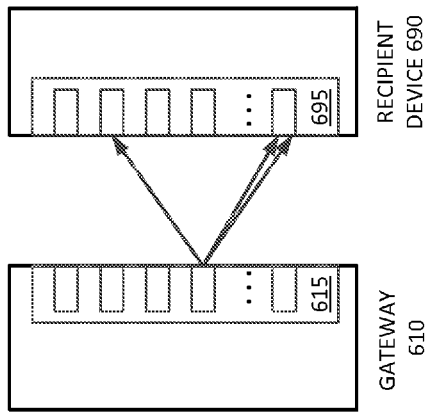
FIG. 6A illustrates a sequence of messages, according to an exemplary embodiment of the present invention.
Figure 6B:
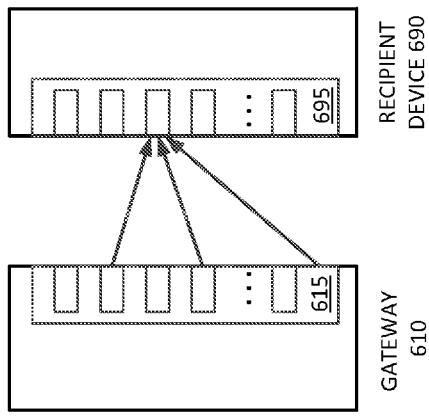
FIG. 6B illustrates a sequence of messages, according to another exemplary embodiment of the present invention.
Figure 6C:
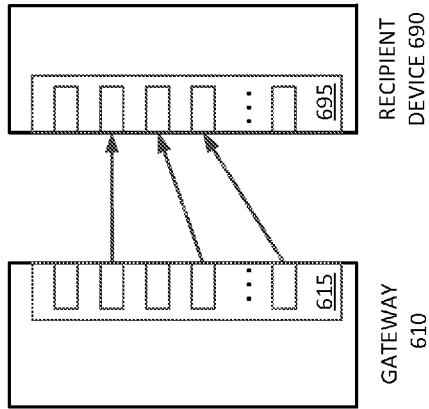
FIG. 6C illustrates a sequence of messages, according to a further exemplary embodiment of the present invention.

FIGS. 6A-C each illustrates a predetermined sequence of messages that can be used by gateway device 610 to authenticate a recipient device 690, according to various embodiments. While the predetermined sequence of messages is shown to include three messages, it should be appreciated that the predetermined sequence of messages can include any number of messages, for example, two or more messages, five or more messages, or ten or more messages. Recipient device 690 can be a client device of a client network, a host device such as a server of the host network of gateway device 610, or other type of device that gateway device 610 is attempting to establish a communication channel with. Recipient device 690 includes a recipient port interface 695 with logical recipient ports for interfacing to gateway device 610. Gateway device 610 can be a gateway device according to any of the embodiments described above. Gateway device 610 includes at least one gateway port interface 615 with logical gateway ports for interfacing to recipient device 690. In embodiments in which recipient device 690 is a client device of a client network, gateway port interface 615 can be a client port interface, and the gateway ports can be logical client ports. In embodiments in which recipient device 690 is a server or other type of device in the host network, gateway port interface 515 can be a host port interface, and the gateway ports can be logical host ports.

FIG. 6A illustrates a predetermined sequence of messages that is sent from gateway device 610 to recipient device 690, according to one embodiment. The predetermined sequence of messages can be, for example, a predetermined sequence of server synchronize messages, a predetermined sequence of client synchronize-acknowledgment messages, or a predetermined sequence of server acknowledge messages. The predetermined sequence of messages is sent from the same gateway port of gateway device 610, which can be any one of the gateway ports on gateway port interface 615, and is sent to and received on a predetermined order of recipient ports on recipient device 690. The predetermined order of recipient ports can be any order of recipient ports, and more than one message can be sent to the same recipient port. Thus, according to the embodiment as shown in FIG. 6A, a predetermined sequence of messages can include messages that have the same source port identifier identifying a gateway port of gateway device 610, and a predetermined order of destination port identifiers identifying a predetermined order of recipient ports of recipient device 590.

FIG. 6B illustrates a predetermined sequence of messages that is sent from gateway device 610 to recipient device 690, according to another embodiment. The predetermined sequence of messages can be, for example, a predetermined sequence of server synchronize messages, a predetermined sequence of client synchronize-acknowledgment messages, or a predetermined sequence of server acknowledge messages. The predetermined sequence of messages is sent from a predetermined order of gateway ports of gateway device 610. The predetermined order of gateway ports can be any order of gateway ports on gateway port interface 615, and more than one message can be sent from the same gateway port. Each message in the predetermined order of messages is sent to and received on the same recipient port of recipient device 690, which can be any one of the recipient ports on recipient port interface 695 of recipient device 690. Thus, according to the embodiment as shown in FIG. 6B, a predetermined sequence of messages can include messages that have a predetermined order of source port identifiers identifying a predetermined order of gateway ports of gateway device 610, and the same destination port identifier identifying a recipient port of recipient device 690.

FIG. 6C illustrates a predetermined sequence of messages that is sent from gateway device 610 to recipient device 690, according to a further embodiment. The predetermined sequence of messages can be, for example, a predetermined sequence of server synchronize messages, a predetermined sequence of client synchronize-acknowledgment messages, or a predetermined sequence of server acknowledge messages. The predetermined sequence of messages is sent from a predetermined order of gateway ports of gateway device 610. The predetermined order of gateway ports can be any order of gateway ports on gateway port interface 615, and more than one message can be sent from the same gateway port. The predetermined sequence of messages is sent to and received on a predetermined order of recipient ports of recipient device 690. The predetermined order of recipient ports can be any order of recipient ports on recipient port interface 695, and more than one message can be sent to and received on the same recipient port. Thus, according to the embodiment as shown in FIG. 6C, a predetermined sequence of messages can include messages that have a predetermined order of source port identifiers identifying a predetermined order of gateway ports of gateway device 610, and a predetermined order of destination port identifiers identifying a predetermined order of recipient ports of recipient device 690.

It should be appreciated that in various embodiments, the predetermined sequence of messages used for authenticating and establishing a communication channel between devices through a gateway device can include a combination of one or more of the embodiments described above. For example, a predetermined sequence of messages used for authenticating and establish a communication channel between two devices can include a combination of predetermined sequences of synchronize messages including: (1) a sequence of synchronize messages with the same source port identifier and a predetermined order of destination port identifies; and (2) sequence of synchronize messages with a predetermined order of source port identifies and the same destination port identifier. A predetermined sequence of messages used for authenticating and establish a communication channel between two devices can also include a combination of various predetermined sequences of synchronize messages, and/or various predetermined sequences of synchronize-acknowledgement messages, and/or various predetermined sequences of acknowledge messages.

Methods for Establishing a Communication Channel

Figure 7:
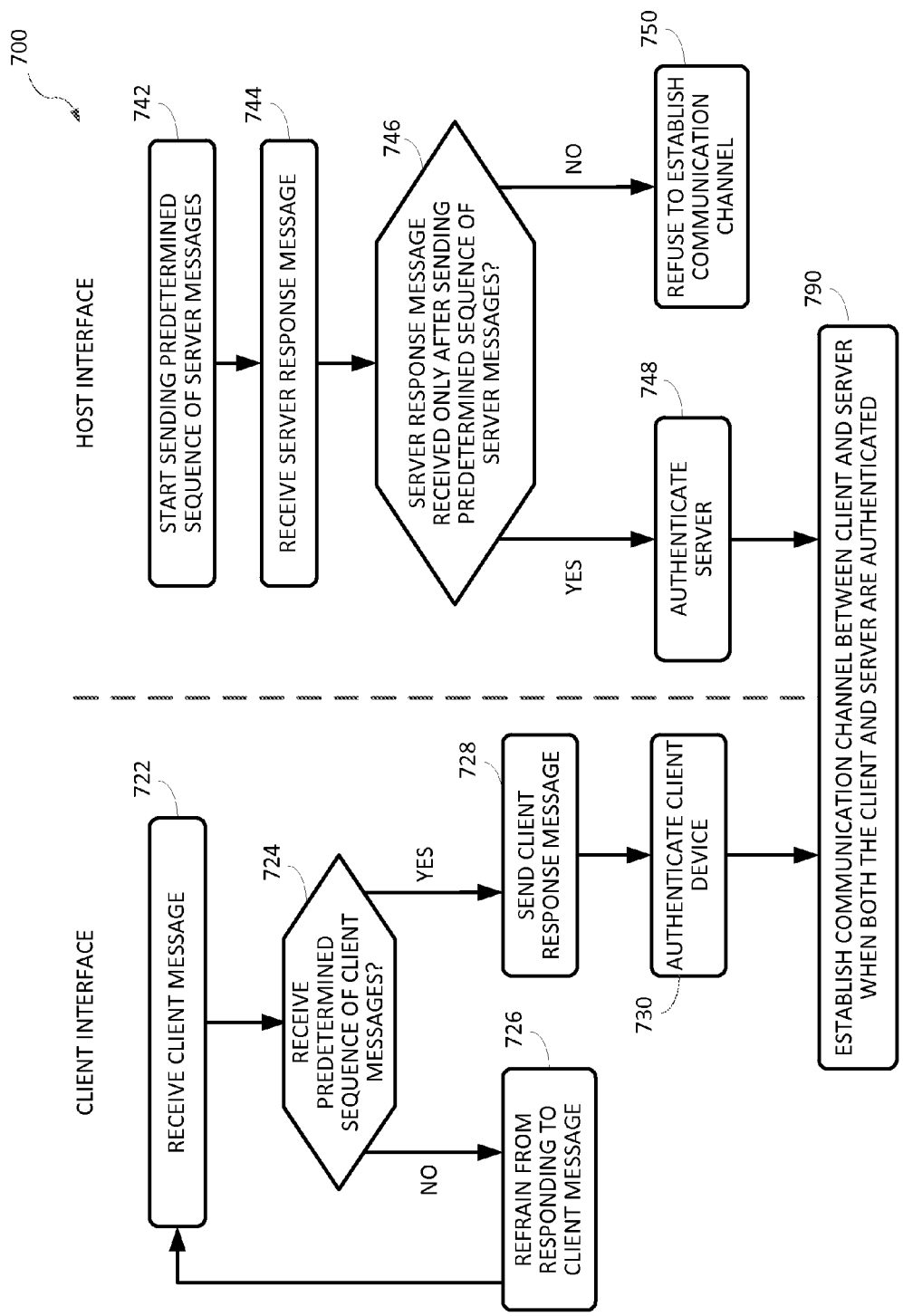
FIG. 7 illustrates a flow diagram of a method for establishing a communication channel, according to one embodiment of the present invention.

FIG. 7 illustrates a flow diagram 700 for establishing a communication channel between a client device communicatively coupled to a client interface of a gateway device and a host device such as a server communicatively coupled to a host interface of the gateway device, according to various embodiments. It should be understood that blocks 722-730 of the client interface can be performed independently of and/or concurrently with blocks 742-750 of the host interface.

On the client interface of the gateway device, at block 722, the gateway device receives a client message from a client device on the client interface of the gateway device. At block 724, the gateway device determines if a predetermined sequence of client messages has been received, for example, by comparing the sequence of any previously received client messages combined with the client message received in block 722 with a predetermined sequence of client messages programmed in the access rules of the gateway device that gateway device expects to receive from an authorized client device. The predetermined sequence of client messages can be any one of or combination of the predetermined sequences of client messages described above. In an exemplary embodiment, the predetermined sequence of client messages can be a predetermined sequence of client synchronize messages. If the gateway device determines that the predetermined sequence of client messages has not yet been received, then at block 726, the gateway device refrains from responding to the client message, and the process continues back to block 722. If the gateway device determines that the entire predetermined sequence of client messages has been received, then at block 728, the gateway device sends a client response message. In one exemplary embodiment, the client response message can be a client synchronize-acknowledgment message. Then at block 730, the gateway device authenticates the client device to be an authorized client device that is allowed to communicate with a host device of the host network, because the predetermined sequence of client messages has been received from the client device.

On the host interface of the gateway device, the gateway device initiates the process of authenticating and establishing a connection to a host device such as a server of the host network of the gateway device by sending a predetermined sequence of server messages out the host interface. At block 742, the gateway device starts sending the predetermined sequence of server messages. The predetermined sequence of server messages can be any one of or combination of the predetermined sequences of server messages described above. In an exemplary embodiment, the predetermined sequence of server messages can be a predetermined sequence of server synchronize messages. At block 744, the gateway device receives a server response message from the server on the host interface. At block 746, the gateway device determines if the server response message is received only after the gateway device has finished sending the entire predetermined sequence of server messages. In other words, the gateway device determines if the server response message is received without any other server response message being received by the gateway device during the time when the gateway device is sending out the predetermined sequence of server messages. If the gateway device determines that the server response message is received prior to the completion of the gateway device sending out the predetermined sequence of server messages, then at block 750, the gateway device can refuse to establish a communication channel to the server.

In some embodiments, at block 746, in addition to determining if the server response message is received only after the gateway device has finished sending the entire predetermined sequence of server messages, the gateway device can also determine if the server response message is received in response to the last server message of the predetermined sequence of server messages, for example, by comparing an acknowledge sequence number in the server response message with the initial sequence number of the last server message of the predetermined sequence of server messages. The server response message is received in response to the last server message if the acknowledge sequence number equals the initial sequence number plus one. If the gateway device determines that the server response messages is not received in response to the last server message of the predetermined sequence of server messages, the gateway device can also refuse to establish a communication channel to the server at block 750.

If the gateway device determines that the server response message is received only after the gateway device has finished sending out the entire predetermined sequence of server messages, then at block 748, the gateway device authenticates the server to be an authorized host device that is allowed to communicate with a client device, because the server did not respond to the server messages until the predetermined sequence of server messages has been sent to the server. At block 790, the gateway device establishes a communication channel between the client device and the server through the gateway device when both the client and the server has been authenticated.

In some embodiments, before the communication channel is established, the server may send a cryptographic key challenge to the gateway device. The cryptographic key challenge can include a random number and a request for the gateway device to encrypt the random number using a cryptographic key that is only know to authorized devices that are allowed to send user messages to the sever. The cryptographic key can be a symmetric key or an asymmetric key preloaded in the gateway device. Upon receiving the cryptographic key challenge from the server, the gateway device encrypts the received random number using the requested cryptographic key that was preloaded in the gateway device, and sends the encrypted random number to the server. The server then decrypts the received encrypted random number using a symmetric key or an asymmetric key corresponding to the cryptographic key. If the result matches the random number that server has previously sent to the gateway device, then the server communication channel is established. If the result matches the random number that server has previously sent to the gateway device, then the communication channel is established at block 790. If the result does not match the random number that server has previously sent to the server may refuse to the connection to the gateway device. A similar cryptographic key challenge can also be used between the client device and the gateway device if the client device includes cryptographic capabilities.

Figure 8:
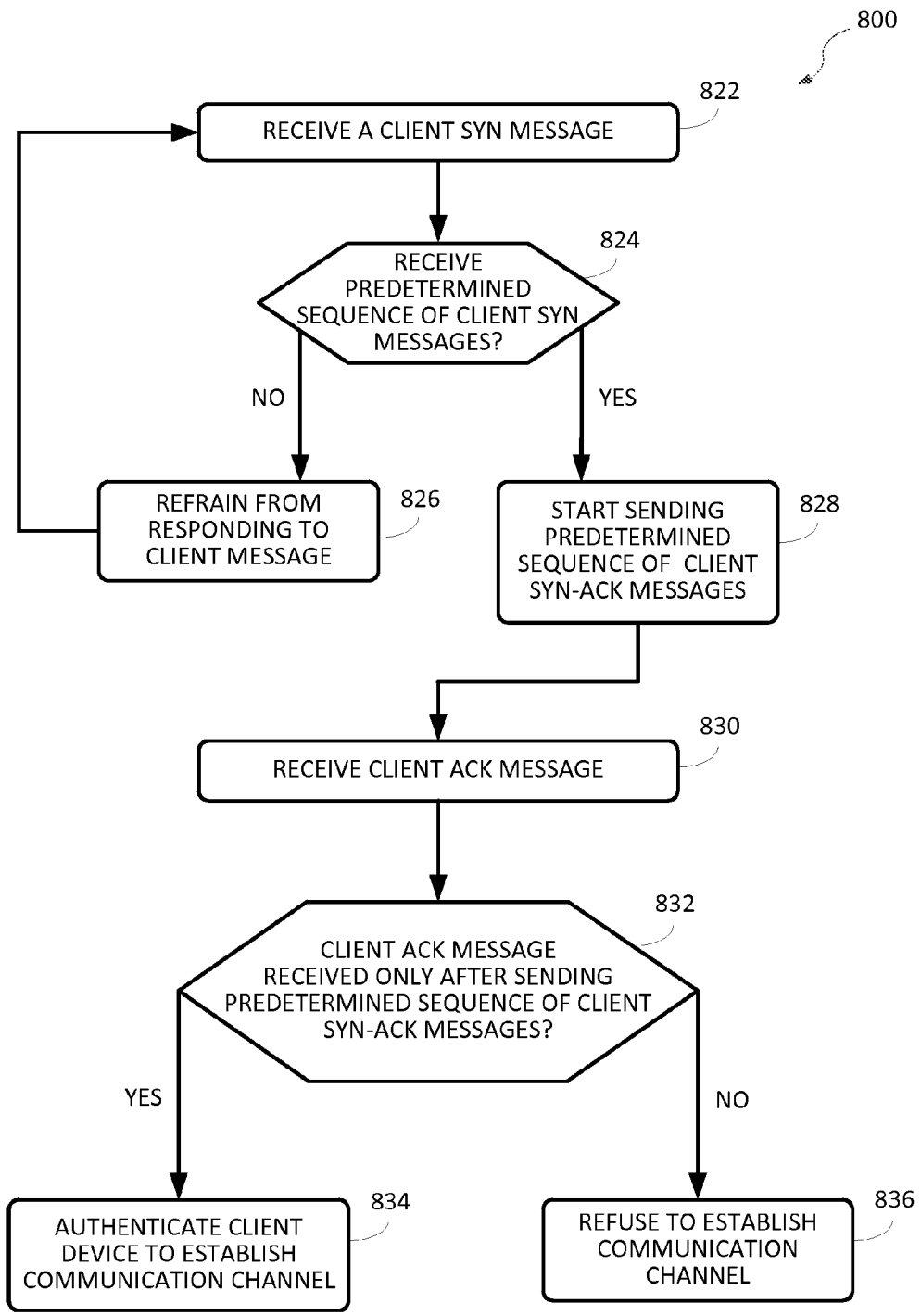
FIG. 8 illustrates a flow diagram of a method for authenticating a client device used for establishing a communication channel, according to one embodiment of the present invention.

FIG. 8 illustrates a flow diagram 800 for authenticating a client device to establish a communication channel between the client device and a server through a gateway device, according to an alternative embodiment. A client device initiates the process of establishing a communication channel by sending a client synchronize message to gateway device. At block 822, the gateway device receives the client synchronize message on the client interface of the gateway device. At block 824, the gateway device determines if a predetermined sequence of client synchronize messages that the gateway device expects to receive from an authorized client device has been received. If the predetermined sequence of client synchronize messages has not yet been received from the client device, then at block 826, the gateway device refrains from responding to the client synchronize message received in block 822 and does not send out a client synchronize-acknowledgment message, and the process returns back to block 822. If the gateway device determines that the predetermined sequence of client synchronize messages has been received from the client device, then at block 828, the gateway device starts sending a predetermined sequence of client synchronize-acknowledgment messages out the client interface to the client device.

Next, at block 830, the gateway device receives a client acknowledge message from the client device on the client interface. At block 832, the gateway device determines if the client acknowledge message is received only after the gateway device has finished sending out the entire predetermined sequence of client synchronize-acknowledgment messages. In other words, the gateway device determines if the client acknowledge message is received without any other client acknowledge message being received by the gateway device during the time when the gateway device is sending out the predetermined sequence of client synchronize-acknowledgment messages. If the gateway device determines that the client acknowledge message is received prior to the completion of the gateway device sending out the predetermined sequence of server messages, then at block 836, the gateway device can refuse to establish a communication channel with the client device.

In some embodiments, at block 830, in addition to determining if the client acknowledge message is received only after the gateway device has finished sending the entire predetermined sequence of the client synchronize-acknowledgement messages, the gateway device can also determine if the client acknowledge message is received in response to the last client synchronize-acknowledgement message of the predetermined sequence of client synchronize-acknowledgement messages, for example, by comparing an acknowledge sequence number in the client acknowledge message with the initial sequence number of the last client synchronize-acknowledgement message of the predetermined sequence of client synchronize-acknowledgement messages. The client acknowledge message is received in response to the last client synchronize-acknowledgement message if the acknowledge sequence number equals the initial sequence number plus one. If the gateway device determines that the client acknowledge message is not received in response to the last client synchronize-acknowledgement message of the predetermined sequence of client synchronize-acknowledgement messages, the gateway device can also refuse to establish a communication channel with the client device at block 836.

If the gateway device determines that the client acknowledge message is received only after the completion of the gateway device sending out the predetermined sequence of client synchronize-acknowledgment messages, then at block 834, the gateway device authenticates the client device to be an authorized client device that is allowed to communicate with a host device of the host network. A communication channel can then be established between the client device and a host device through the gateway device pending authentication of the host device.

Figure 9:
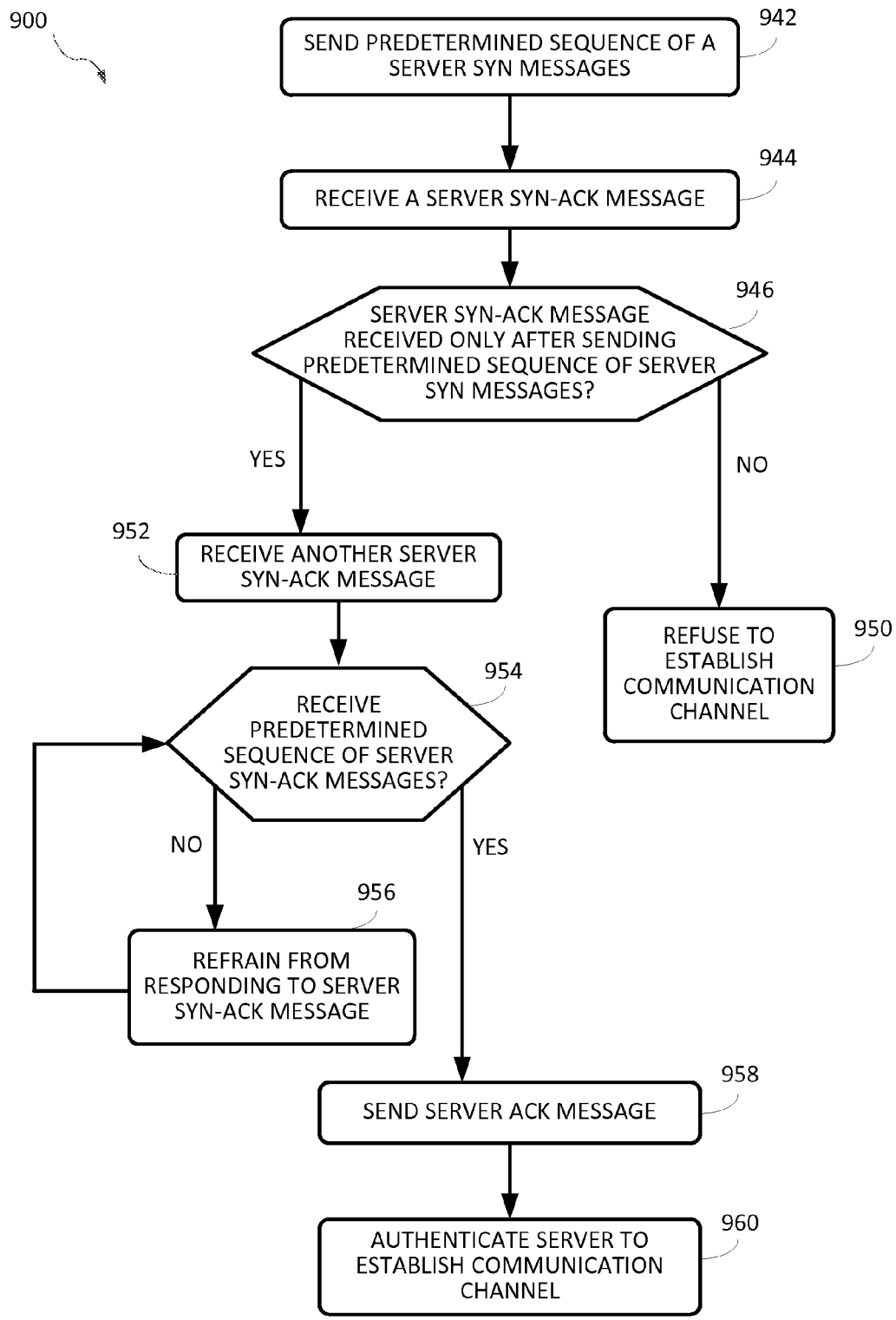
FIG. 9 illustrates a flow diagram of a method for authenticating a host device used for establishing a communication channel, according to one embodiment of the present invention.

FIG. 9 illustrates a flow diagram 900 for authenticating a server to establish a communication channel between a client device and the server through a gateway device, according to an alternative embodiment. At block 942, the gateway device starts sending a predetermined sequence of server synchronize messages to the server out the host interface. At block 944, the gateway device receives a server synchronize-acknowledgment message from the server on the host interface. At block 946, the gateway device determines if the server synchronize-acknowledgment message is received only after the gateway device has finished sending the entire predetermined sequence of server synchronize messages. In other words, the gateway device determines if the server synchronize-acknowledgment message is received without any other server synchronize-acknowledgment message being received by the gateway device during the time when the gateway device is sending out the predetermined sequence of server synchronize messages. If the gateway device determines that the server synchronize-acknowledgment message is received prior to the completion of the gateway device sending out the predetermined sequence of server synchronize messages, then at block 950, the gateway device can refuse to establish a communication channel between the server and a client device.

In some embodiments, at block 946, in addition to determining if the server synchronize-acknowledgment message is received only after the gateway device has finished sending the entire predetermined sequence of server synchronize messages, the gateway device can also determine if the server synchronize-acknowledgment message is received in response to the last server synchronize message of the predetermined sequence of server synchronize messages, for example, by comparing an acknowledge sequence number in the server synchronize-acknowledgment message with the initial sequence number of the last server synchronize message of the predetermined sequence of server synchronize messages. The server synchronize-acknowledgment message is received in response to the last server synchronize message if the acknowledge sequence number equals the initial sequence number plus one. If the gateway device determines that the server synchronize-acknowledgment message is not received in response to the last server synchronize message of the predetermined sequence of server synchronize messages, the gateway device can also refuse to establish a communication channel to the server at block 950.

If the gateway device determines that the server response message is received only after the gateway device has finished sending out the predetermined sequence of server synchronize messages, the process continues to block 952. At block 952, the gateway device receives another server synchronize-acknowledgment message. At block 954, the gateway device determines if a predetermined sequence of server synchronize-acknowledgment messages has been received. If the predetermined sequence of server synchronize-acknowledgment messages has not yet been received, then at block 956, the gateway device refrains from responding to the server synchronize-acknowledgment message received at block 952, and the process continues back to block 952. If the gateway device determines that the predetermined sequence of server synchronize-acknowledgment messages has been received, then at block 958, the gateway device sends a server acknowledge message to the server out the host interface. At block 960, the gateway device authenticates the server to be an authorized host device that is allowed to communicate with a client device. A communication channel can then be established between the server and a client device through the gateway device pending authentication of the client device.

Although the above embodiments have been described with reference to a client device initiating a communication channel or a connection with a gateway device, and a gateway device initiating a communication channel or a connection with a host device, it should be understood that the communicate channels described above are two-way communication channels, and the in some embodiments, the gateway device may initiate a communication channel or a connection with a client device, and a server may initiate a communication channel or a connection with a gateway device using any of the sequences of messages described herein.

Furthermore, while the predetermined sequence of messages have been described as being received in order, in some alternative embodiments, a predetermined sequence of messages can be considered as correctly received as long as all the messages in the predetermined sequence of messages are received without any additional intervening messages being exchanged between the devices during transmission of the predetermined sequence of messages. In other words, in these alternative embodiments, a predetermined sequence of messages can be considered as being correctly received even if the messages are received out of order. Such an implementation can be used to compensate for network environments with unpredictable network latency that can causes messages to be received out of order at a recipient device.

By using the methods, devices, and systems according to embodiments of the invention disclosed herein to establish a communication channel between a client device on a client network that relays user messages from a user device to a server on a payment processing network, the risk of a malicious party being able to hack into the payment processing network, for example, by using port scanning techniques, can be mitigated. Thus, embodiments of the present invention can enable secure end-to-end transmission of sensitive information such as PINS and PANs between a user device such as a mobile phone and a payment processing network to build confidence in users of mobile banking that their information are protected.

User Device

Figure 10:
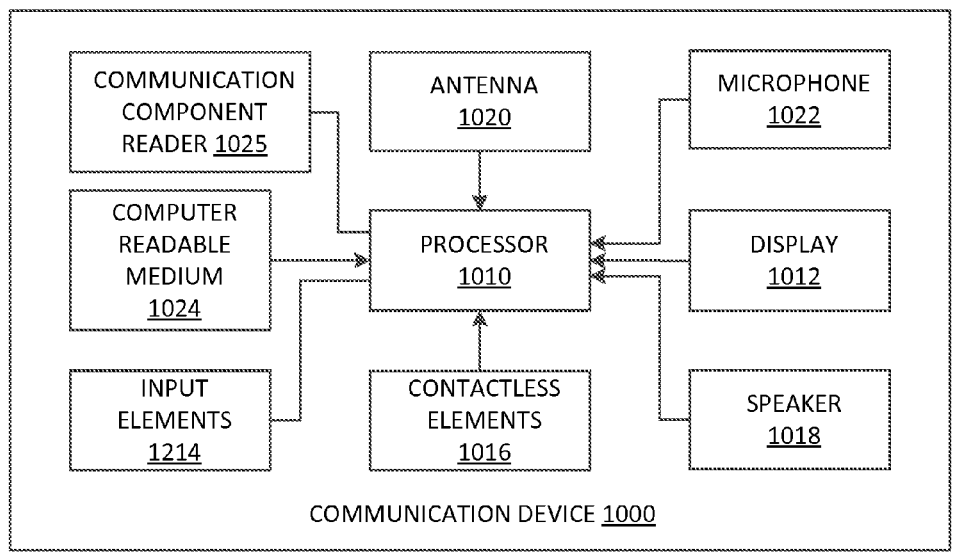
FIG. 10 illustrates a user device, according to one embodiment of the present invention.

FIG. 10 shows a user device 1000 according to the some of the embodiments described above. The user device 1000 includes a communication component reader 1025 for accepting a communication component such as a SIM card. The user device 1000 also includes a display 1012, an input element 1014, computer readable medium 1024 such as volatile and non-volatile memory, processor 1010 and at least one antenna 1020. In addition, the communication device 1000 may include a dual interface including both contact (not shown) and contactless interface 1016 for transferring information through direct contact or through an integrated chip, which may be coupled to a second antenna. In addition, the user device 1000 may be capable of communicating through a cellular network, a wireless provider network, or a mobile operator network, such as GSM through an antenna 1020, for example to send and receive Short Message Service (SMS) messages or Unstructured Supplementary Service Data (USSD) messages. Thus, the user device 1000 may be capable of transmitting and receiving information wirelessly through both short range NFC, radio frequency (RF) and cellular connections. In some embodiments, user device 1000 may have cryptographic capabilities to send encrypted messages and/or communications, and/or messages protected with message authentication codes or hash codes.

Computer System

Figure 11:
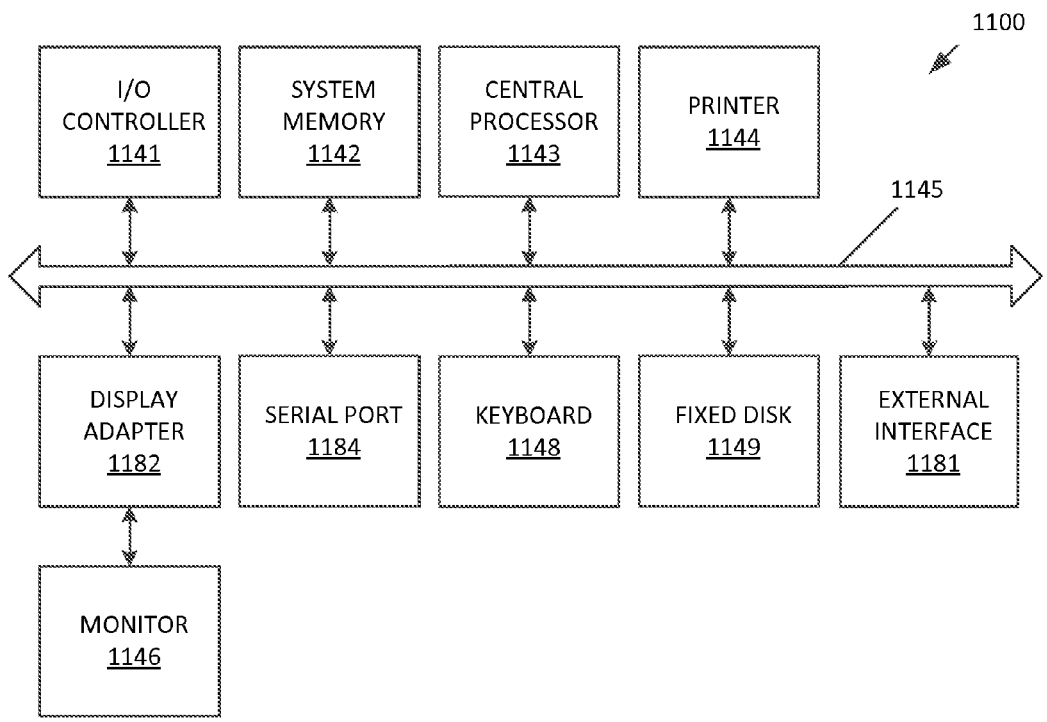
FIG. 11 illustrates a computer system, according to various embodiments of the present invention.

FIG. 11 is a block diagram of a computer system that may be used to implement any of the devices (e.g., gateway device, client device, host device, server, etc.) described above. The subsystems shown in FIG. 11 are interconnected via a system bus 1145. Additional subsystems, which may be optional, such as a printer 1144, a keyboard 1148, a fixed disk 1149, a monitor 1146 that is coupled to display adapter 1182, and others are shown. Peripherals and input/output (I/O) devices, which couple to I/O controller 1141, can be connected to the computer system by any number of means known in the art, such as serial port 1184. For example, serial port 1184 or external interface 1181 can be used to connect the computer apparatus to a wide area network such as the Internet, a mouse input device, or a scanner. The interconnection via system bus 1145 allows the central processor 1143 to communicate with each subsystem and to control the execution of instructions from system memory 1142 or the fixed disk 1149, as well as the exchange of information between subsystems. The system memory 1142 and/or the fixed disk 1149 may embody a non-transitory computer readable medium which contains instructions that cause the processor to execute the methods described herein.

In certain implementations, individual blocks (or steps) described above with respect to the Figures may be combined, eliminated, or reordered. Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method in a gateway device for establishing a communication channel between a client device communicatively coupled to a client interface of the gateway device and a server communicatively coupled to a host interface of the gateway device, the method comprising:
    receiving client messages on the client interface,
    refraining from sending a client response message out the client interface until a predetermined sequence of client messages is received on the client interface;
    sending a predetermined sequence of server messages out the host interface; and
    establishing a communication channel to communicate user messages between the client device and the server, the communication channel being established after:
    receiving the predetermined sequence of client messages on the client interface; and
    receiving a server response message on the host interface only after the predetermined sequence of server messages has been sent by the gateway device;
    wherein the predetermined sequence of client messages is a predetermined sequence of client synchronize messages, and the predetermined sequence of server messages is a predetermined sequence of server synchronize messages;
    wherein the client interface comprises a plurality of client ports, and the predetermined sequence of client messages comprises client synchronize messages that are received on the plurality of client ports in a predetermined client port order.

2. The method of claim 1, wherein the predetermined sequence of server synchronize messages comprises server synchronize messages having a predetermined order of destination port identifiers.

3. The method of claim 1, further comprising:
    sending, in response to receiving the predetermined sequence of client synchronize messages, a predetermined sequence of client synchronize-acknowledgment messages out the client interface; and receiving a client acknowledge message on the client interface only after the predetermined sequence of client synchronize-acknowledgment messages has been sent by the gateway device, wherein the communication channel is established after receiving the client acknowledge message.

4. The method of claim 1, further comprising:
receiving the user messages on the established communication channel from the client device, wherein the user messages include authentication codes;
verifying, by the gateway device, the authentication codes of the user messages; and
transmitting the verified user messages to the server on the established communication channel.

5. The method of claim 1, further comprising:
receiving the user messages on the established communication channel from the client device in an encrypted format;
decrypting, by the gateway device, the user messages; and
transmitting the user messages to the server on the established communication channel.

6. The method of claim 5, further comprising:
re-encrypting, by the gateway device, the user messages prior to transmitting the user messages to the server.

7. The method of claim 5, wherein the client device is communicatively coupled to a wireless provider network, and the user messages originated from a mobile device as Short Message Service (SMS) messages or Unstructured Supplementary Service Data (USSD) messages.

8. The method of claim 5, wherein the user messages originated from a mobile device as Radio Frequency (RF) communications or Near Field Communication (NFC) communications.

9. The method of claim 5, wherein the user messages are associated with payment transactions.

10. A gateway device comprising:
a client interface including a plurality of client ports;
a host interface including a plurality of host ports;
a processor coupled to the client interface and the host interface; and
a machine readable storage medium storing executable program code, which when executed by the processor, causes the processor to:
receive client messages on the client interface from a client device,
refrain from sending a client response message out the client interface until a predetermined sequence of client messages is received on the client interface;
send a predetermined sequence of server messages out the host interface to a server; and
establish a communication channel to communicate user messages between the client device and the server, the communication channel being established after receiving the predetermined sequence of client messages on the client interface, and receiving a server response message on the host interface only after the predetermined sequence of server messages has been sent;
wherein the predetermined sequence of client messages is a predetermined sequence of client synchronize messages, and the predetermined sequence of server messages is a predetermined sequence of server synchronize messages;
wherein the client interface comprises a plurality of client ports, and the predetermined sequence of client messages comprises client synchronize messages that are received on the plurality of client ports in a predetermined client port order.

11. The gateway device of claim 10, wherein the predetermined sequence of server synchronize messages comprises server synchronize messages having a predetermined order of destination port identifiers.

12. The gateway device of claim 10, wherein the machine readable storage medium storing executable program code, which when executed by the processor, further causes the processor to:
send, in response to receiving the predetermined sequence of client synchronize messages, a predetermined sequence of client synchronize-acknowledgment messages out the client interface; and
receive a client acknowledge message on the client interface only after the predetermined sequence of client synchronize-acknowledgment messages has been sent, wherein the communication channel is established after the client acknowledge message is received.

13. The gateway device of claim 10, wherein the machine readable storage medium storing executable program code, which when executed by the processor, further causes the processor to:
receive the user messages on the established communication channel from the client device, wherein the user messages include authentication codes;
verify the authentication codes of the user messages; and
transmit the verified user messages to the server on the established communication channel.

14. The gateway device of claim 10, wherein the machine readable storage medium storing executable program code, which when executed by the processor, further causes the processor to:
receive the user messages on the established communication channel from the client device in an encrypted format;
decrypt the user messages; and
transmit the user messages to the server on the established communication channel.

15. The gateway device of claim 14, wherein the machine readable storage medium storing executable program code, which when executed by the processor, further causes the processor to:
re-encrypt the user messages prior to transmitting the user messages to the server.

16. The gateway device of claim 14, wherein the client device is communicatively coupled to a wireless provider network, and the user messages originated from a mobile device as Short Message Service (SMS) messages or Unstructured Supplementary Service Data (USSD) messages.

17. The gateway device of claim 14, wherein the user messages originated from a mobile device as Radio Frequency (RF) communications or Near Field Communication (NFC) communications.

18. The gateway device of claim 14, wherein the user messages are associated with payment transactions.

* * * * *